United States Patent [19]
Lacy

[11] Patent Number: 6,078,039
[45] Date of Patent: Jun. 20, 2000

[54] SEGMENTAL TUBE ARRAY HIGH PRESSURE GAS PROPORTIONAL DETECTOR FOR NUCLEAR MEDICINE IMAGING

[75] Inventor: Jeffrey L. Lacy, Houston, Tex.

[73] Assignee: Proportional Technologies, Inc., Houston, Tex.

[21] Appl. No.: 09/119,878

[22] Filed: Jul. 21, 1998

Related U.S. Application Data

[60] Provisional application No. 60/053,248, Jul. 21, 1997.

[51] Int. Cl.[7] ..................................................... H01L 31/00
[52] U.S. Cl. .............................. 250/214 VT; 250/385.1; 250/374
[58] Field of Search ......................... 250/214 VT, 214.1, 250/207, 385.1, 374; 313/538, 539, 541

[56] References Cited

U.S. PATENT DOCUMENTS

| | | | |
|---|---|---|---|
| 4,870,282 | 9/1989 | Lacy | 250/385.1 |
| 4,999,501 | 3/1991 | Lacy | 250/385.1 |
| 5,500,534 | 3/1996 | Robinson et al. | 350/385.1 |

*Primary Examiner*—Que T. Le
*Assistant Examiner*—Thanh X. Luu
*Attorney, Agent, or Firm*—Akin, Gump, Strauss, Hauer & Feld, L.L.P.

[57] ABSTRACT

A structure for detecting radiation, useful in an imaging camera for nuclear medicine, comprising a plurality of tubes, each of said tubes having (1) an electrically conductive wall structure defining a tube internal radius and a proximal and a distal end, (2) a pressure retaining and electrically insulative tube end closure means at each tube end, (3) a coaxial electrically conductive element located between said insulative tube end closure means; said tubes containing xenon at a pressure sufficient to provide for a photoelectron range there within of or less than that distance existing between the proximal and distal ends thereof and a maximum ionization collection distance of or less than the tube internal radius; said tubes positioned in a honeycomb-like array such that each proximal and distal tube end is in a common plane one with another, respectively.

4 Claims, 12 Drawing Sheets

Am-241
588psi
7380V

FIG.9J

Tl-201
400psi
5580V

FIG.9K

Tl-201
508psi
6580V

FIG.9L

Tc99m
98psi
2335V

FIG.9M

Tc99m
268psi
4050V

SEGMENTAL TUBE ARRAY HIGH PRESSURE GAS PROPORTIONAL DETECTOR FOR NUCLEAR MEDICINE IMAGING

CROSS-REFERENCE TO RELATED APPLICATIONS

This application claims the benefit of and priority to U.S. Provisional Application No. 60/053,248 which was filed Jul. 21, 1997.

BACKGROUND OF THE INVENTION

1. Field of the Invention

Devices for nuclear medicine imaging.

2. Description of the Related Art

Scintillation camera technology has serious limitations in nuclear imaging applications. These devices are extremely large, bulky, and fragile, and require careful and routine quality control monitoring in order to maintain acceptable image quality. These characteristics have limited many applications of nuclear imaging in medicine.

Pressurized xenon multiwire proportional detectors for medical imaging have been explored by several groups, including Proportional Technologies, Inc. (Bolon, IEEE Transactions on Nuclear Science, Vol. 36, No. 1, 661–664, 1978; Anisimov, Nucl. Instr. Meth. A235:582–588, 1985; Bellazzini, Nucl. Instr. Meth. 228:193–200, 1984; Lacy, J. Nucl. Med. 256:1003–1012, 1984; Lacy, Nucl. Instr. Meth. A269:369–376, 1988; Lacy, J. Nucl. Med. 29:293–301, 1988; Verani, Amer. J. Card. Imag., Vol. 2, No. 3:206–213, 1988; Adams, J. Nucl. Med. 31:1723–1726, 1990; Verani, J. Am. Coll. Cardiol. 29:1490–1497, 1992; Verani, J. Am. Coll. Cardiol. 19:297–306, 1992). In order to achieve acceptable efficiencies at relevant gamma energies, such devices as have been proposed must be thick and operate at high pressures. Ionization must therefore be collected over long drift distances to the active anode avalanche grid without losses and without substantial dispersion of the electron cloud. Electron dispersion can cause serious fluctuation and lengthening of the delivered avalanche signal while losses through attachment to electronegative gas contaminants can seriously impair energy resolution and charge proportionality. Also, pressure must be adequate so that the energetic photoelectron range is small in the gas relative to the spatial resolution desired. Such operation has proved to be feasible at moderate pressures up to 3 atmospheres (atm) and modest gamma energies (Lacy, J. Nucl. Med. 256:1003–1012, 1984). Ionization is efficiently collected over a 5 cm active detector depth and avalanche signals with little or no dispersion are obtained at energies up to and slightly above 60 keV. However, the maximum practical detector pressure, imposed by the large entrance window of this camera design, limits application to imaging by this camera to a radiopharmaceutical the isotope of which is Ta-178(55, 64 keV). With a camera of this design a non-competitive efficiency of less than 30% is achieved for T1-201 while for Tc-99m, the efficiency is less than 5%. Although image quality is good for T1-201, for Tc-99m, the photoelectron range is on the order of 1.8 cm, preventing accurate localization and causing a very lengthy and variable avalanche signal as the extended electron cloud is collected. Even for Ta-178, the improvements for a camera of this design are desirable. Overall efficiency for this low energy isotope is only 50%. Both patient dose and radiopharmaceutical cost could be halved if camera efficiency could be increased to near 100%.

Attempts to push detector pressures to significantly higher levels, in order to achieve improved high energy efficiency and more compact ionization deposition, have failed. Bolon et al., supra, have reported one of the more significant attempts in this direction (1978). In Bolon's work, a detector was constructed and operated at 6 atm with a 90% xenon/10% methane gas mixture. Efficiency of this device for Tc-99m was only 20%, despite its sizable depth of more than 10 cm. Charge collection performance was also disappointing. Owing to the substantial collection distances, energy resolution was suboptimal for T1-201 and essentially absent for Tc-99m. From Bolon's report it clearly appears that much higher pressures than 6 atm are required for acceptable performance with Tc-99m, and large collection distances cannot be tolerated if good energy resolution is required at such pressures.

A high speed xenon multiwire detector, developed by Proportional Technologies, Inc. (PTI), and now described in U.S. Pat. Nos. 4,870,282 and 4,999,501, provides unique and advantageous characteristics for in vivo cardiac imaging. Within the last decade it has been commercially developed into a portable nuclear medicine camera system, which has been utilized extensively at the Baylor College of Medicine, The Methodist Hospital and The Philadelphia Heart Institute in the nuclear cardiology field (Lacy, supra, 1988; Verani, J. Am. Coll. Cardiol. 19:297–306, 1992; Gioia, Am. Heart J., 130:1062–1067, 1995). It is currently being evaluated at several clinical sites; including Yale School of Medicine, Hahnemann Hospital of Allegheny University, and Hartford Hospital; for use in assessment of global and regional ventricular function. In these applications, the PTI high speed xenon multiwire detector is used to image the generator-produced radiopharmaceutical, Ta-178, which is intravenously injected and utilized as a blood label. Via this approach, high-quality, first-pass imaging of the heart is now performed (Lacy, supra, 1988; Lacy, J. Nucl. Med. 32:2158–2161, 1991). In over six years of clinical use, this camera, the Multiwire Gamma Camera (MWGC), has proved to be a reliable and practical device, and especially valuable in post-intervention evaluation of ventricular performance (Verani, supra, 1992; Gioia, supra, 1995). It, the MWGC, is very rugged, requires practically no maintenance, and has a relatively low cost.

Figure 1:
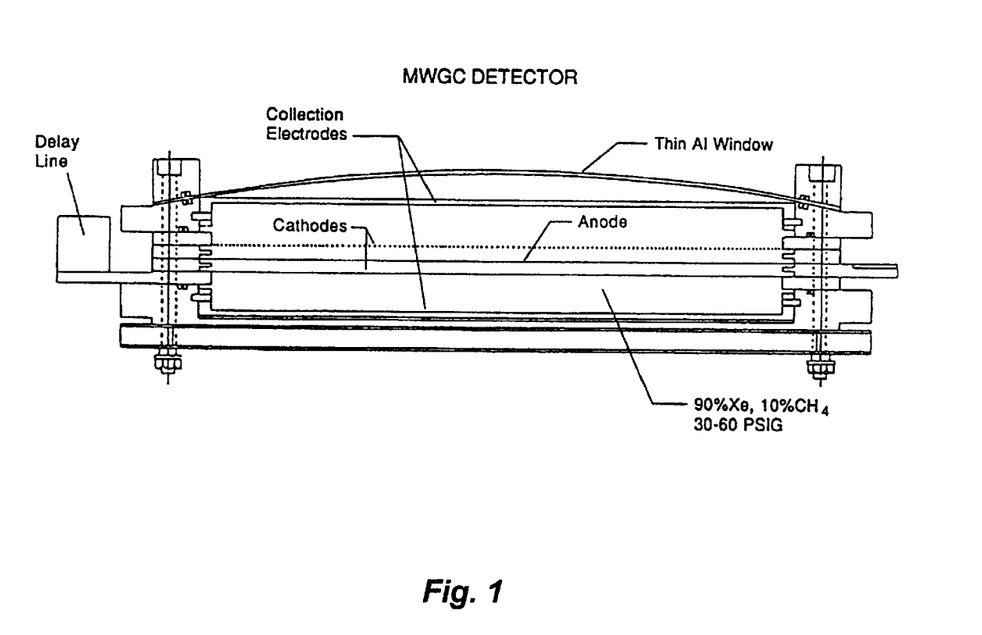
FIG. 1 is a cross sectional view of the prior art Xe multiwire proportional gamma camera (MWGC).

The MWGC device, as generally shown in FIG. 1, has a 25 cm diameter circular sensitive area, and a 5 cm working volume depth. It operates at three atmospheres absolute pressure (3 atm) with a xenon/methane (90/10) gas mixture. The MWGC consists of two drift regions and a detection region, which is contained within an aluminum pressure vessel having a thin aluminum entrance window of spherical shape. X-rays entering through the aluminum window interact with the pressurized gas. The resulting ionization is impelled to the detection region by a drift field of 2000 volts/cm. The drifted ionization is collected at the anode, where the charge is amplified by gas avalanche.

Position determination of the anode avalanche is obtained by detection of the signals induced in the two cathode grids, which are oriented orthogonally to each other (Lacy, NIM, 1974). Each wire of each cathode grid is attached to a tap of a discrete delay line, and position is sensed by measurement of the delay time between occurrence of the avalanche on the anode grid and arrival of the signal at the ends of the cathode delay lines. The use of very high-speed delay lines (delay 10 nsec/cm), combined with the intrinsically fast gas avalanche process provides high rate operation with a peak count rate of 850,000 cps. Spatial resolution is defined by the 2 mm wire spacing of the detector grids. Because of the digital nature of the readout system, images are highly uniform and distortion free. Intrinsic spatial resolution of the device is 2.5 mm FWHM.

Figure 2:
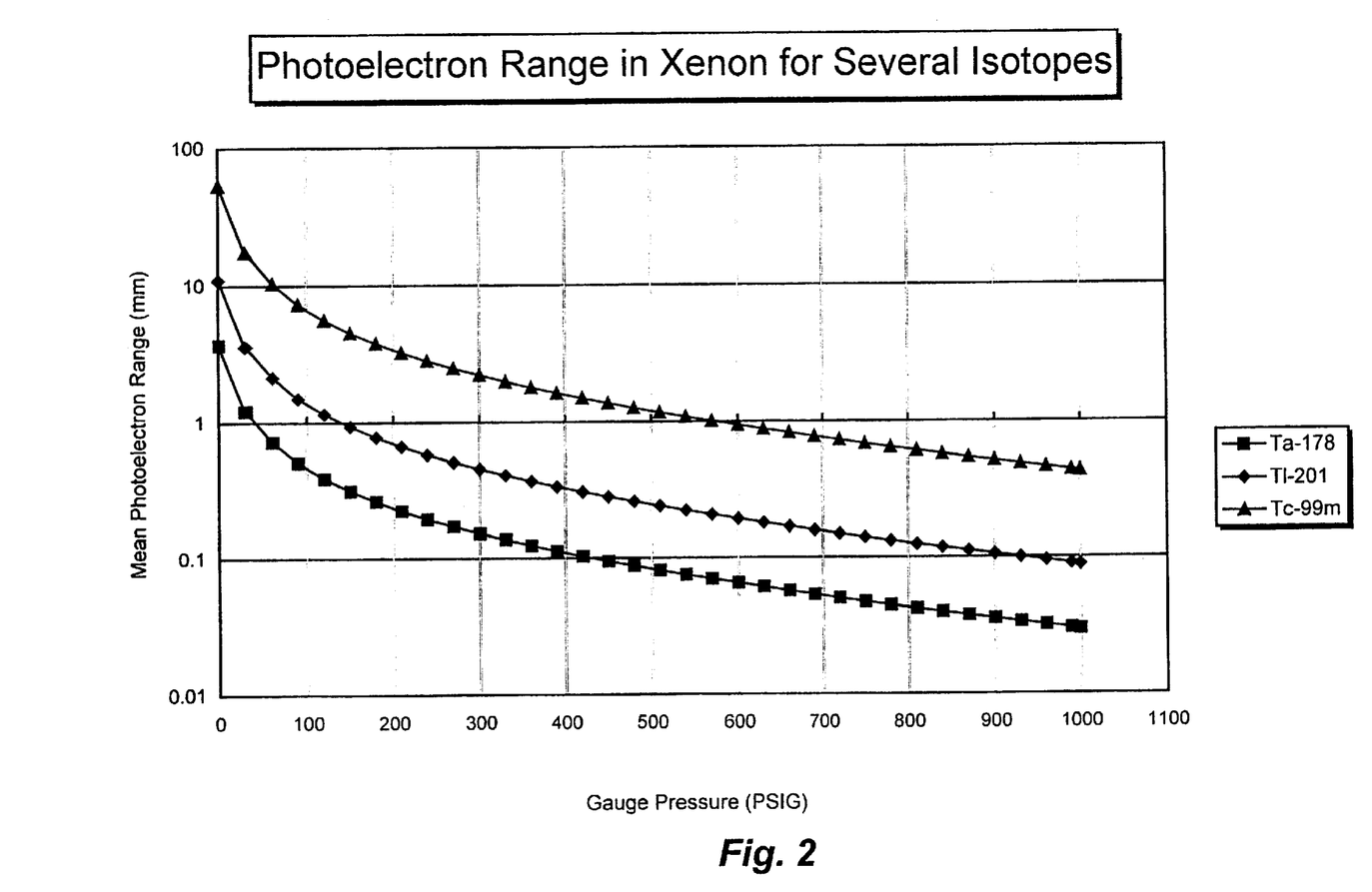
FIG. 2 is a graph showing the photoelectron range in Xenon, as a function of pressure of Xenon, for a Ta-178, Tl-201 and Tc-99m based radiopharmaceutical.

The pressurized xenon multiwire proportional camera (MWGC) has found successful application in medical imaging of the short-lived isotope Ta-178. The MWGC camera developed by Proportional Technologies, Inc.(PTI) for this purpose has received 510(k) premarket authorization (#K963730), and Phase III FDA studies sponsored by PTI are underway for the Ta-178 radiopharmaceutical under IND #51666. The design of the MWGC, however, has limitations which prevent broader application of the MWGC device with other radiopharmaceuticals, thus narrowing its focus as previously discussed. For competitive imaging of Tl-201, a pressure of 10–20 atm is required while for Tc-99m, a pressure approaching 60 atm is needed. The photoelectron range in Xenon for these isotopes is shown in FIG. 2 as a function of Xenon pressure in atmospheres (atm).

SUMMARY OF THE INVENTION

This invention comprises an innovative new xenon gas detector design for an imaging camera which is segmented into tubes oriented parallel to the incident radiation. By this detector design, pressures up to 100 atm or more can be easily contained with a very lightweight, safe, and inexpensive structure. High quality proportional gas performance can be achieved in such tubes up to a pressure of at least 20 atm.

The xenon tube camera described here may be highly compact, rugged, and low-cost. Since photomultiplier tubes are not needed, the overall depth of the detector including all readout electronics and shielding may be as little as 8–10 cm, and since no perimeter dead space around the active detector area is required, several such detectors could be placed immediately adjacent to one another for multiview tomographic imaging. Furthermore, because of the light weight, the mechanical support structure is far less bulky and expensive. Finally, this highly compact gas detector camera form will lend itself to systems for specialized applications, such as breast imaging, as well as portable operation.

This camera, operated at a pressure of 10–20 atmospheres, provides substantially improved performance with Ta-178 based radiopharmaceutics; attaining nearly a two-fold increase in sensitivity, much higher count rate, and as well as some image quality improvements. A camera of the design of this invention can perform very well for Tl-201 imaging and will therefore provide a full-spectrum cardiology device capable of high quality perfusion and angiographic applications. Operated at a camera detector pressure approaching 60 atmospheres, this camera design can image a Tc-99m radiopharmaceutical with characteristics equal to or better than those of scintillation devices.

A segmented tube array detector design such as of the design of the imaging camera of this invention, with high efficiency and good energy resolution for Tl-201 and Tc-99m, provides many advantages over both existing scintillation camera technology and solid-state detectors under development. A detector array of a camera of this invention is intrinsically very rugged and, since each tube structurally stands alone, there is little structure surrounding the basic detection volume. The weight of each of these detectors is dramatically less than that of an NaI detector because of the greatly reduced depth of the package and the resultant reduction of necessary shielding. A portable bedside imaging system for full-spectrum cardiology applications is feasible, providing both angiographic and myocardial perfusion imaging in the intensive care setting. Even a two-headed tomographic bedside camera is feasible. Today's bulky scintillation cameras are highly incompatible with such applications.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 3:
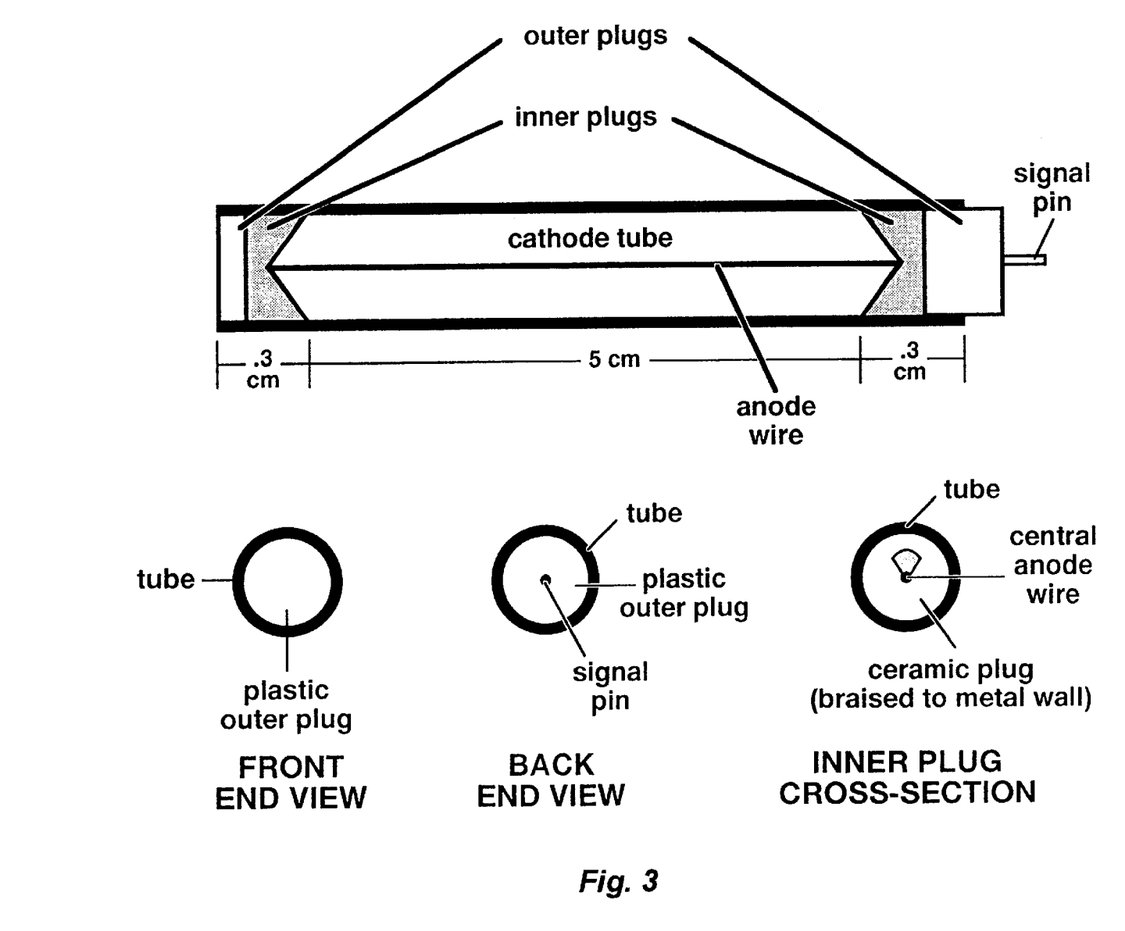
FIG. 3 illustrates a side cross-sectional view and by front and end views, the construction of one of the multiple detector tubes of which the detector volume of the invention detector volume of a camera of this invention is comprised.

The gas proportional detector here proposed comprises a novel approach to construction which segments the detector volume of an imaging camera into thin tubes perpendicular to the face of the structure. FIG. 3 illustrates the construction of a detector tube, while FIGS. 4 and 5, respectively, illustrate a cross-sectional view and a schematic prospective view of the arrangement of multiple detection tubes within the detector volume of the camera.

Figure 6:
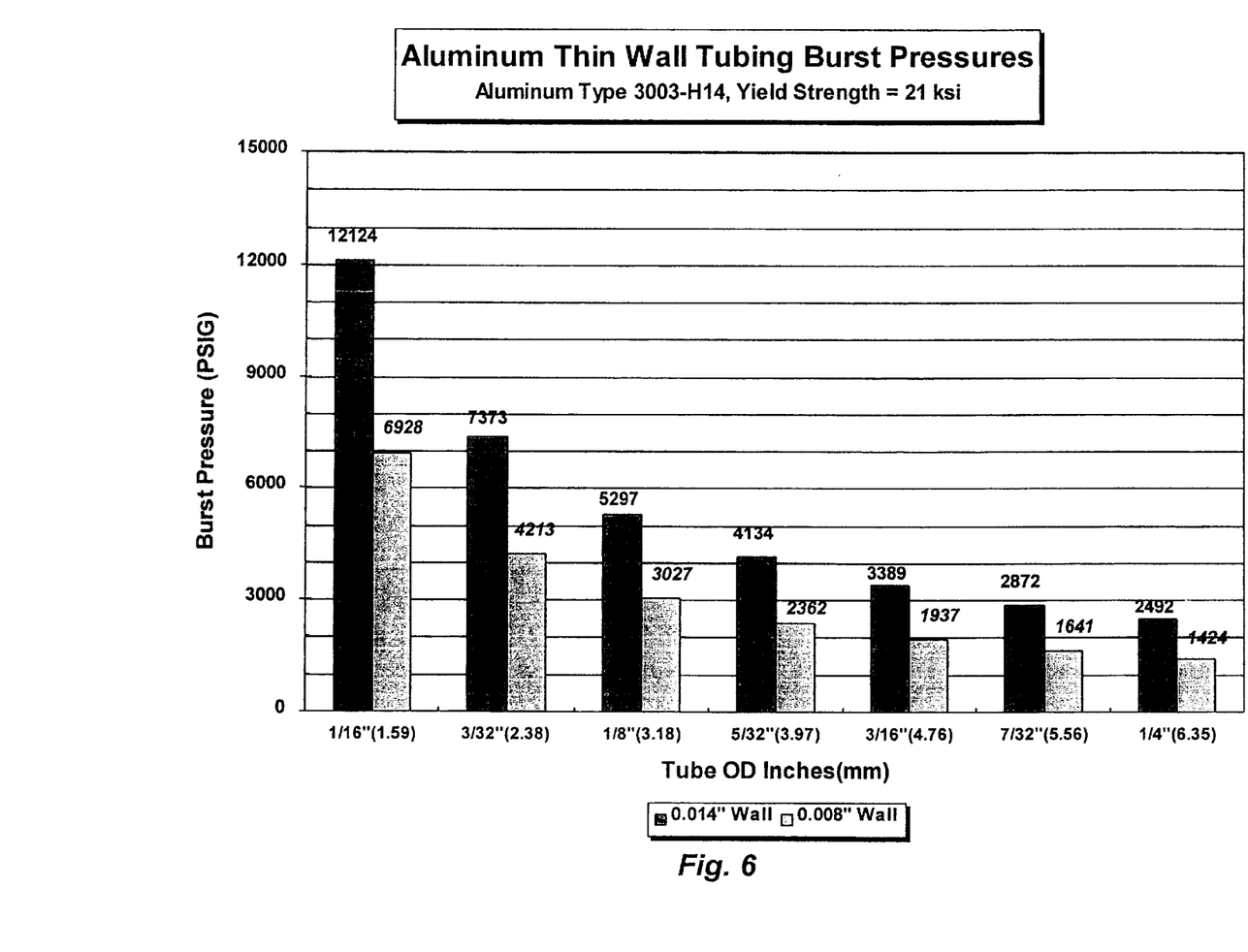
FIGS. 6 and 7 illustrate the theoretical burst pressure of various aluminum and brass tubes, respectively, of various wall thicknesses and outside diameters, to be used in tube construction.
Figure 7:
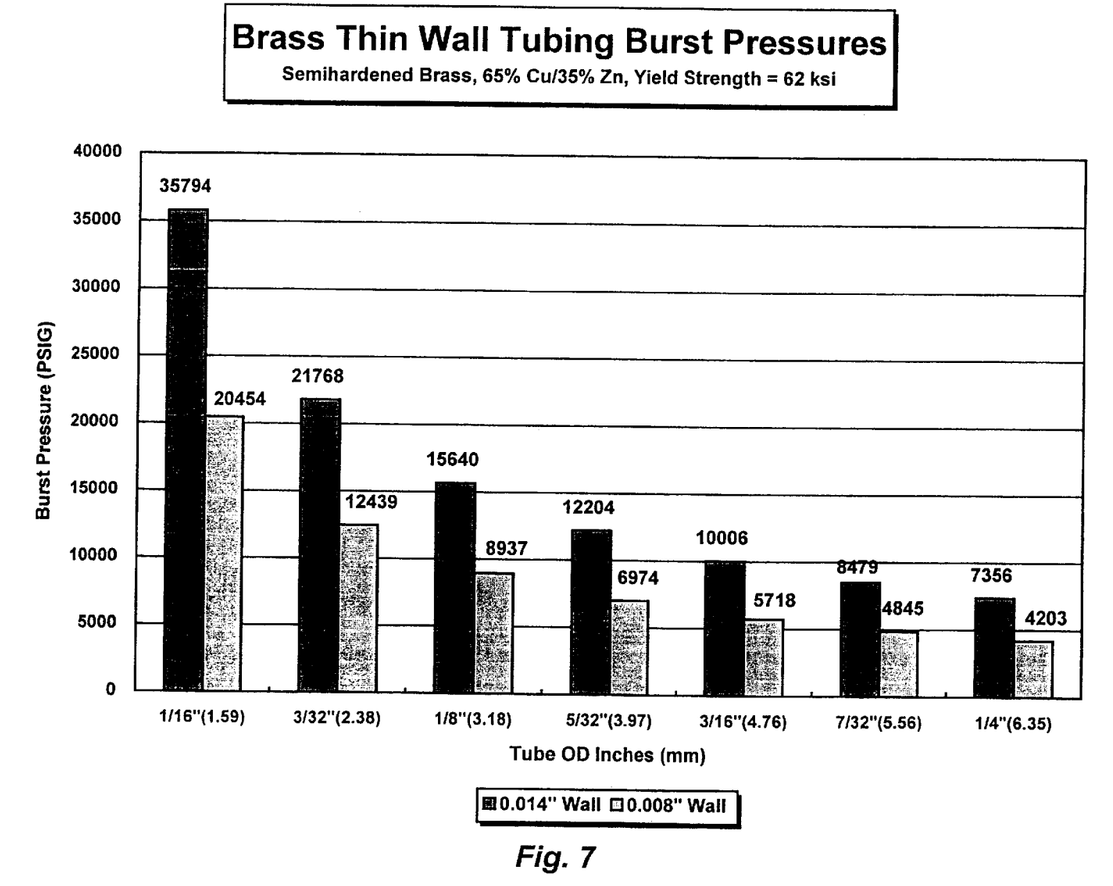

As shown in FIG. 3, each tube has its own central anode wire, and the shell of the tube acts as the negative coaxial electrode. The possibility of interaction of the radiation in the detector tube walls can be minimized through the use of very thin walled tubing. Since the inner diameter of the tubes is small, in the range 3.0–7.5 mm, the pressure handling capacity of such a tube can be very high. The theoretical burst pressure of readily available aluminum and brass tubing sizes for wall thicknesses of 0.014" and 0.008" are shown in FIGS. 6 and 7. For example, the theoretical burst pressure of a 5 mm (3/16 inch) OD aluminum tube with a wall thickness of 0.014 inch is 3390 psi; that of a brass tube of these same dimensions is over 10,000 psi. Even higher pressure capability is achieved by bonding of adjacent tubes in a tightly packed, honeycomb-like array. Therefore, the required pressures can be achieved easily, safely, and inexpensively.

This multi-tube detector volume structural design also dramatically cuts the maximum ionization collection distance down to the radius of the tube, 2.5 mm in the above-given tube example. This is a very important feature which is crucial to achieving practical performance at the very high pressures. Additional benefits may be obtained from the segmentation by providing a means of eliminating the effect of xenon fluorescence. Photoelectric interaction in xenon results in emission of a 30 keV xenon fluorescence photon with 90% efficiency. At high pressures, these are converted near the emission site, but because of the small diameter of the tube elements, some of these emissions may convert in neighboring tubes. The half-value layer of the 30 keV fluorescence radiation in brass or copper is approximately 0.003". Therefore, use of brass or copper tubing can cut down or eliminate passage of this xenon fluorescence photo radiation through tube walls to neighboring tubes. However, this beneficial effect must be traded off with a higher probability of interaction of the primary photons in the denser tube walls causing loss of efficiency.

Although the number of elements in the proposed array of pressurized xenon tubes may at first seem imposing, about three thousand tubes in the above example, low-cost construction and assembly are quite feasible. Techniques of tube construction have been developed in the field of high energy physics which make it possible to construct sizable arrays of such tube structures, filling several cubic meters of volume with tubes of several millimeter diameter.

For basic laboratory imaging, the design of this invention significantly reduces camera cost since there is no basic high-cost element of the system, as there is with a NaI camera and its attendant large crystal and phototube arrays and with solid-state detectors due to the very high cost of each crystal. Furthermore, solid-state devices appear to be intrinsically limited to rather thin structures, resulting in much lower than optimal sensitivity for Tc-99m (Allison, Med. Phys. 7(3):202–206, 1980; Barber, Med. Phys. 18(3):373–381, 1991). This is not a limitation of the xenon tube technology.

Xenon lies just above iodine in the atomic table and therefore has a slightly higher photoelectric cross-section and nearly identical interaction characteristics at gamma energies relevant for nuclear medicine imaging. Thus, given pressurization adequate to achieve similar $g/cm^2$ levels, xenon can provide equal sensitivities to those of NaI cameras. The advantage of attaining such stopping power with a xenon proportional gas detector is that the two-step process of light emission followed by photomultiplication, with its attendant complexities of image digitization and with its effects of increasing the volume and cost of the detector, is avoided. The proportional high pressure xenon gas tube detector of a design as here proposed directly produces millivolt level signals over a matrix of individual tubes or (cells) of essentially any desired segmentation level. Also, because a proportional wire avalanche signal, as is produced with the multiple tube detector of this design, is substantially faster than the light pulse from NaI, a considerably faster readout is possible. Finally, somewhat higher energy resolution can be achieved with a proportional counter electrical detector as employed in the camera of the design of this invention.

Figure 8:
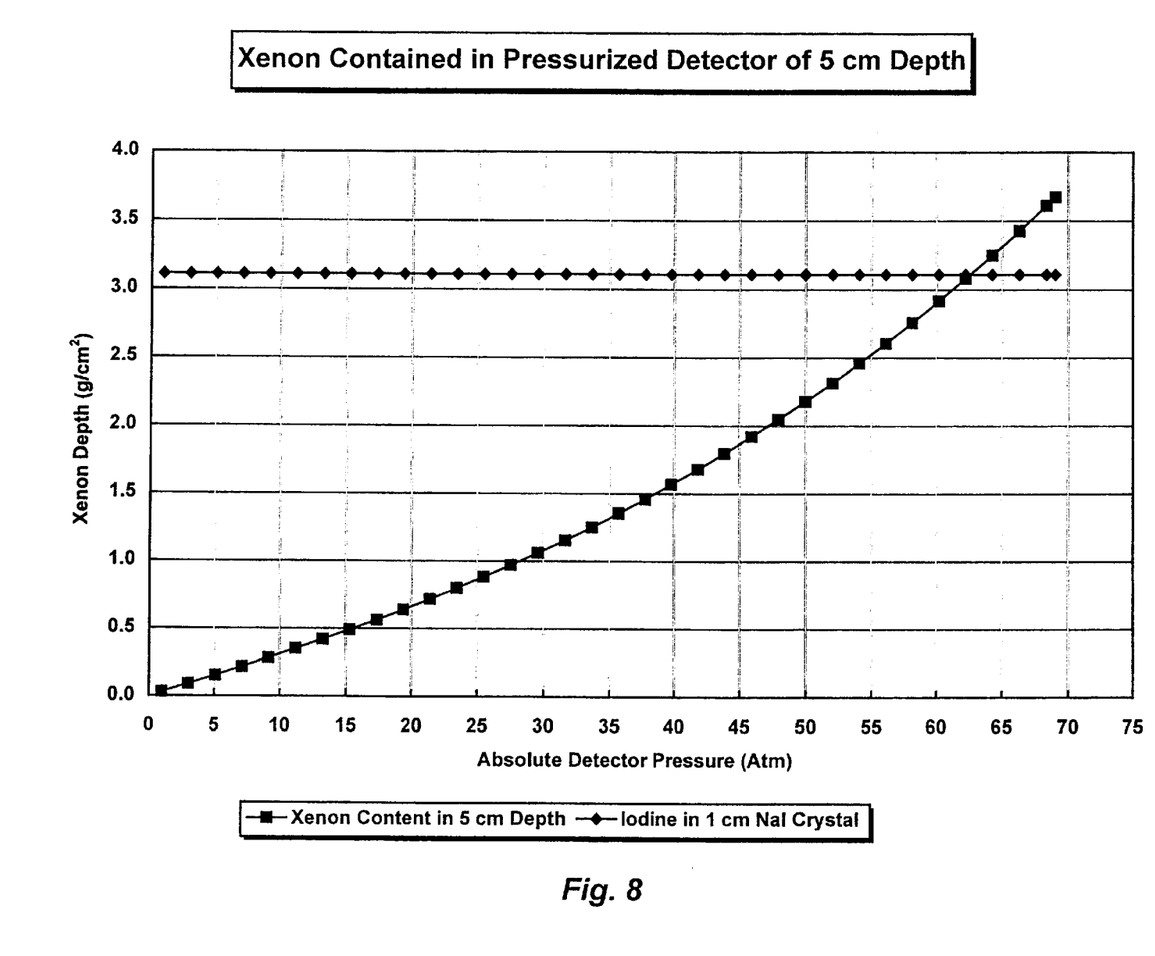
FIG. 8 is a plot of Xenon gas depth versus pressure in a 5 cm thick vessel.
Figure 9A:
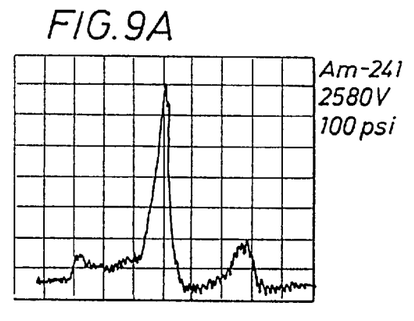
FIG. 9 are photos of pulse height analyzer spectra acquired from a single tube operated at high pressures of 90% Xe, 10% methane and exposed to Am-241, Tl-201 and Tc-99m FIG. 10 plots the operating high voltage required for equal avalanche gain versus the square root of the measured absolute pressure and versus the square root of the effective pressure taking into account compressibility.
Figure 9B:
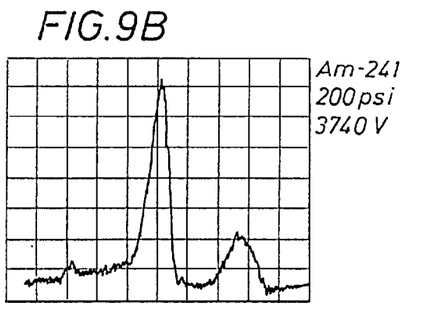
Figure 9C:
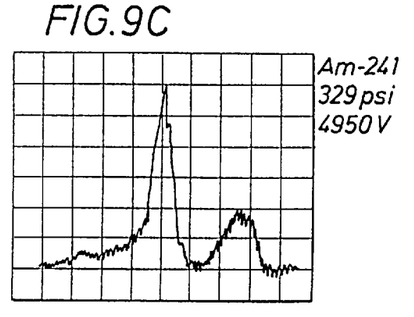
Figure 9D:
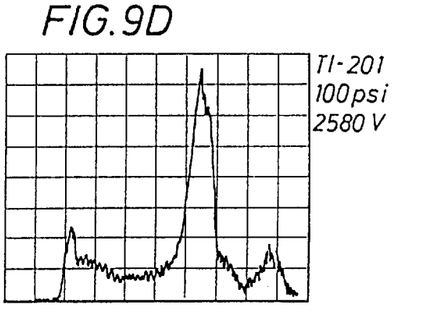
Figure 9E:
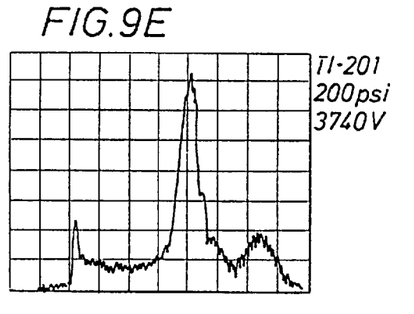
Figure 9F:
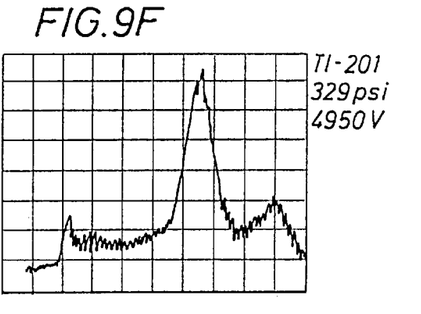
Figure 9G:
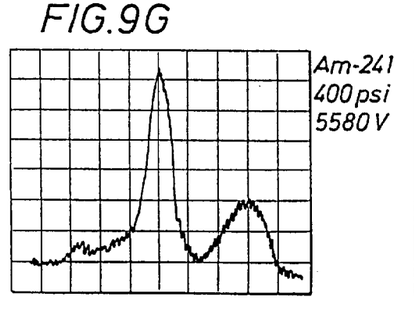
Figure 9H:
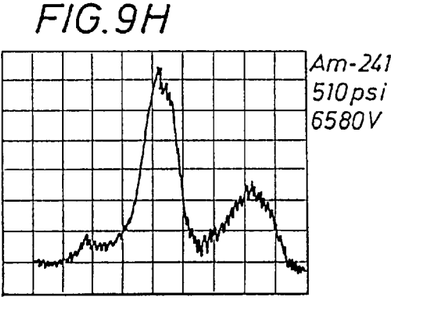
Figure 9I:
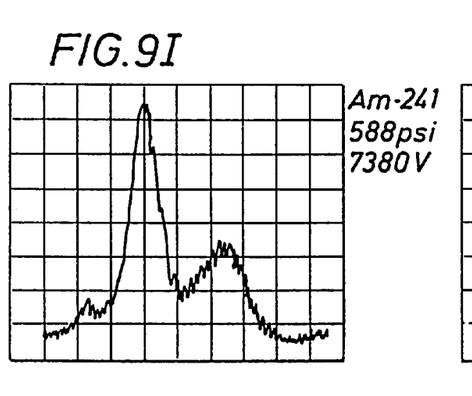
Figure 9J:
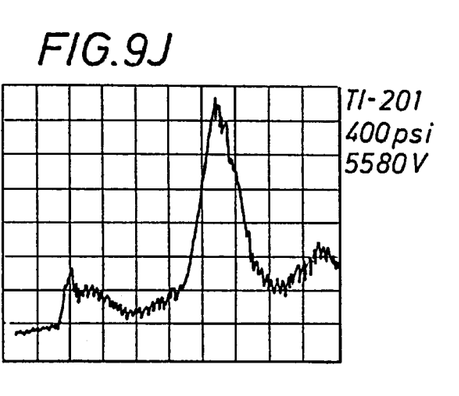
Figure 9K:
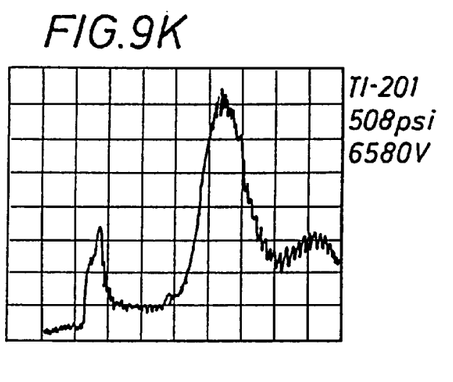
Figure 9L:
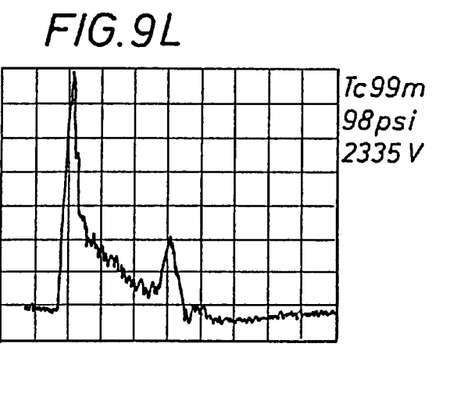
Figure 9M:
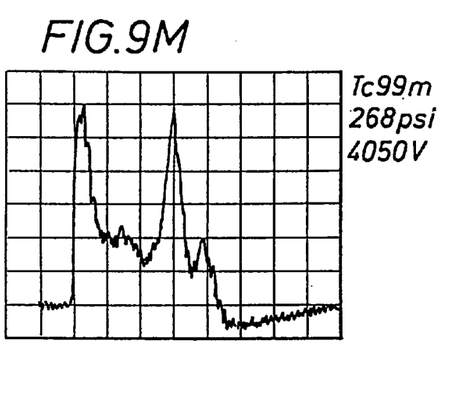

Xenon gas has a critical temperature of 62° F., which means that at typical room temperatures, xenon can exist only as a gas. Therefore, the degree of pressurization of xenon at standard laboratory temperatures is only limited by the feasibility of maintaining structures capable of containing the required pressure and by the maintenance of proportional avalanche function at the required high pressures. At room temperature, xenon gas exhibits a high degree of compressibility as pressure approaches its critical pressure of 850 psi, the pressure at which liquid Xe is formed at 62° F. Because of the interatomic interactions of xenon at these pressures, a substantial deviation from the ideal gas law is seen. In FIG. 8, the xenon contained in a 5 cm deep vessel ($g/cm^2$) is plotted versus pressure and compared with the iodine content of a typical 1 cm deep NaI detector. Surprisingly, at a relatively modest pressure of approximately 60 atm, xenon content, and therefore photoelectric stopping power of the xenon medium, are very close to that of the 1 cm NaI crystal. At this pressure, the density of xenon present is nearly twice that predicted by the ideal gas law. This aids greatly in reducing the demands of pressure containment. At these pressures, the xenon density is 0.6 $g/cm^3$, which is 20% of that of the NaI crystal and approaching that of solid $H_2O$.

Since containment of the required pressures in thin-walled tubing is practical, as previously described, the remaining fundamental issue is the viability of the proportional gas avalanche processes at the high pressures. Since no data is available in the literature at such pressures, limited studies were performed to ascertain the feasibility of such performance. For this work, 5 cm long tubes were constructed using $3/16$" OD×0.012" wall aluminum tubing and an anode wire size of 20 $\mu$m diameter. Studies were performed using 90% xenon, 10% methane gas. Methane has a substantially lower boiling point (−161.5° C.) and critical temperature (−82.1° C.) than does xenon and therefore may be expected to have little influence on the Xenon pressure-volume relationship. Measurements of operating voltage versus pressure were obtained, and pulse height spectra were collected for Am-241, Tl-201, and to a limited degree Tc-99m. Initial testing was done by evacuating the tubes and filling them to the desired pressure. It was quickly discovered that the xenon gas purity was not adequate to support ionization collection at the high pressures of interest. As pressure was increased above 200 psi, energy resolution became poor. Therefore, a simple gas purification system, consisting of an $O_2$, $H_2O$ scavenger column (Supelco #2-2449) positioned at the input to the detector tube, was employed. A small reservoir connected to the input to the cartridge was then filled to the maximum pressure available, and gas was flowed through the tube. Flow rate was adjusted to a few ml/min via a needle valve in the output line, and gas was exhausted by bubbling through an oil trap. Data was collected at regular pressure points as the gas was flowed from the reservoir to the atmosphere over a six hour period. As the pressure decreased, the high voltage applied was adjusted downward to maintain the same level of gain for the 60 keV escape peak. Both Tl-201 and Am-241 spectra were collected at each voltage setting. Voltage was decreased for Tc-99m to give the same signal for the 140 keV escape peak as was produced by the 60 keV escape peak of Am-241. The operating voltage and pressure were recorded and a digital picture was taken of the pulse height analyzer spectrum for each set of conditions (see FIG. 9). For both Am-241 and Tl-201, a small point source of 0.25–1.0 mCi, which was collimated by means of thin lead sheet, was utilized. Because the 140 keV radiation of Tc-99m excites lead fluorescence x-rays, this collimator proved to be unusable for the Tc-99m measurements. This was not discovered until pressure had dropped to 268 psi, and therefore no valid Tc-99m measurements above this level were collected. The lead shield had to be quickly dismantled, and a small vial of Tc-99m was placed essentially in direct contact with the tube. Because of the complexity of this process, only two pressure points, 98 psi and 268 psi, were collected (see bottom two spectra in FIG. 9). The geometry of the source positioning was also less than optimal, and the spectra undoubtedly contain some Compton scatter background from adjacent structures, such as the tabletop to which the tube was fastened. Avalanche proportionality was assessed by comparing the escape peak (30 keV) and the full energy peak (60 keV) for Am-241 and by comparing the T1-201 escape peak (42 keV) with the Am-241 escape peak (30 keV). Tests were carried out to 41 atm, the highest achievable pressure that the gas system of the equipment used in this study could support.

Figure 10:
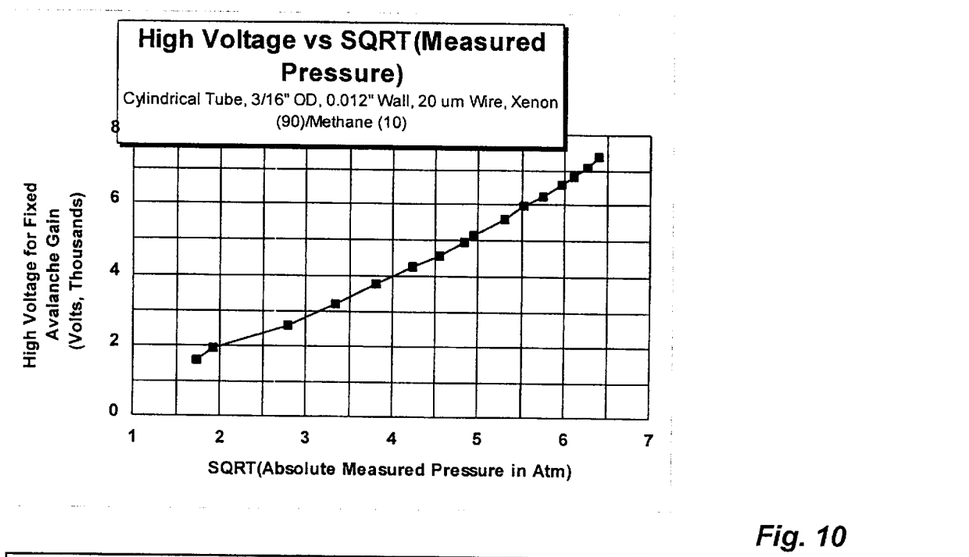

In FIG. 10, the operating high voltage required for equal avalanche gain is plotted, top versus the square root of the measured absolute pressure and, bottom versus the square root of the effective pressure, taking compressibility into account. The plot on the bottom, with compressibility accounted for, shows an accurate square root dependence of high voltage on pressure up to the highest measured value of 41 atm, or an effective pressure of 56 atm. This is a strong indication that no untoward effects are coming into play at the higher pressures and that proportional avalanche gain is being maintained. Examining the spectra in FIG. 9, it is clear that proportional response is maintained up to the highest pressure observed, based on the 2:1 relationship of the 60 keV and 30 keV peaks of Am-241 as well as on the 4:3 relationship of the 42 keV peak of T1-201 and the 30 keV peak of Am-241. Up to a pressure of approximately 100 psi, these spectra show excellent energy resolution, consistent with the theoretical limit of about 8% of deposited energy for the 30 keV and 42 keV escape peaks. As described previously, since these peaks have 30 keV subtracted by the fluorescence escape, this resolution is actually nearly 4% for 60 keV and about 6% for 72 keV. These resolutions are substantially better then those achievable with NaI single crystal cameras.

Although proportionality is well-preserved to the highest pressures observed, there is a clear degradation of energy resolution. Since proportional performance is maintained, the most likely explanation of this degradation is that problems are being encountered in efficiently collecting the deposited free electron cloud produced by the photoelectron interaction to the near vicinity of the anode grid, where avalanching occurs. In the xenon-methane 90/10 mix, a drift field of 300 V/cm·atm is optimally required to achieve saturated drift velocity and in order to minimize losses of electrons through attachment to gas contaminants. The electric field at the perimeter of the 3/16" tube used in these tests is given by $X=0.90V_o$, where $V_o$ is the operating potential of the tube (Snell, 1962). Therefore, at a pressure of 16 atm and operating potential of 4000 V, the perimeter field is 3600 V/cm. At this operating pressure, the drift field is therefore 225 V/cm·atm, which is somewhat below the optimal level of 300 V/cm·atm. Consequently, it is not surprising that some difficulty may be encountered collecting perimeter charge at this and higher pressures. This effect could be solely responsible for the degradation of energy resolution.

There are several solutions to this problem. One of the most significant sources of difficulty when operating at lower than optimal drift fields is that electron attachment and thus sensitivity to gas contaminants becomes more significant. Tests have certainly demonstrated sensitivity to gas contaminants at high pressures, when drift fields are low. The second problem is that diffusion of the electron cloud can occur and cause widening of the collection time distribution and therefore lengthening of the avalanche signal. Both of these sources can produce degradation of energy resolution. Diffusion effects are expected to be minimal in this tube detector camera design, however, because of the very short collection distances involved. Therefore, electron attachment is likely the primary cause of the degradation of energy resolution. The tubes used in the evaluation contained components designed for low pressure applications such as simple plastics and fiberglass, which are susceptible to outgasing. Therefore, gas purity is far from what would be achieved with higher quality materials and with outgasing treatment of materials. Also, it is well-known that lower concentrations of methane, in the 1%–5% range, can substantially lower the field required to reach saturated drift velocity (drift velocity independent of field) (Christophorou, Nucl. Instr. Meth. 171:491–495, 1980). In addition, other drift gases, such as $C_2H_2$, have been employed with xenon which have the effect of lowering the drift field required. Thus, optimization of the quench component is another major focus. There are also changes in tube geometry which may be beneficial. Increasing the size of the anode wire (see FIG. 3) has the effect of increasing the operating voltage, which in turn would increase drift field. Decrease of tube diameter also increases the drift field available at the tube perimeter, essentially linearly with tube diameter. Therefore, decrease of tube diameter by a factor of two should increase the pressure capability by a factor of two. Based on these multiple courses of action, tubes can be developed which will have far superior energy resolution at high pressure than those tested in the pilot study.

Figure 11:
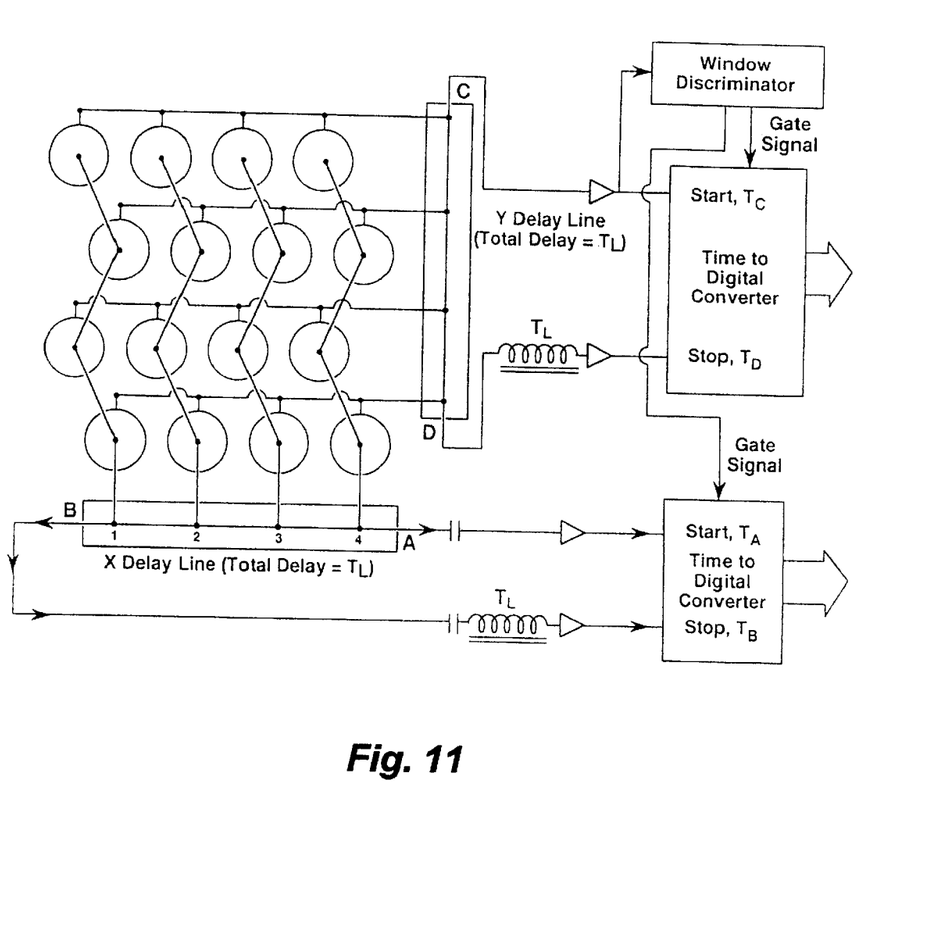
FIG. 11 illustrates a delay line readout system for use in a camera of this invention.

Given a detector which produces a matrix of position signals, the ideal readout system would service each of the 3,000 cells in parallel. Unfortunately, such a system requires an analog, low-noise amplifier for each cell and a sophisticated gate and latch circuit array. Such a system would be much to expensive and bulky for medical applications. Hence a delay line readout system applied to small, discrete subarrays of the overall array is proposed as illustrated in FIG. 11. Each of these subarrays will be read out using this architecture. A 4×4 cell array is illustrated for simplicity, but this can be expanded up to an arbitrary number of cells in x and y dimension. The current Proportional Technologies, Inc. MWGC camera, as previously discussed and illustrated by FIG. 1, utilizes this circuitry for the full 25 cm×25 cm wire grid array and achieves a read out rate of nearly $1.0 \times 10^6$ counts/sec.

Figure 5:
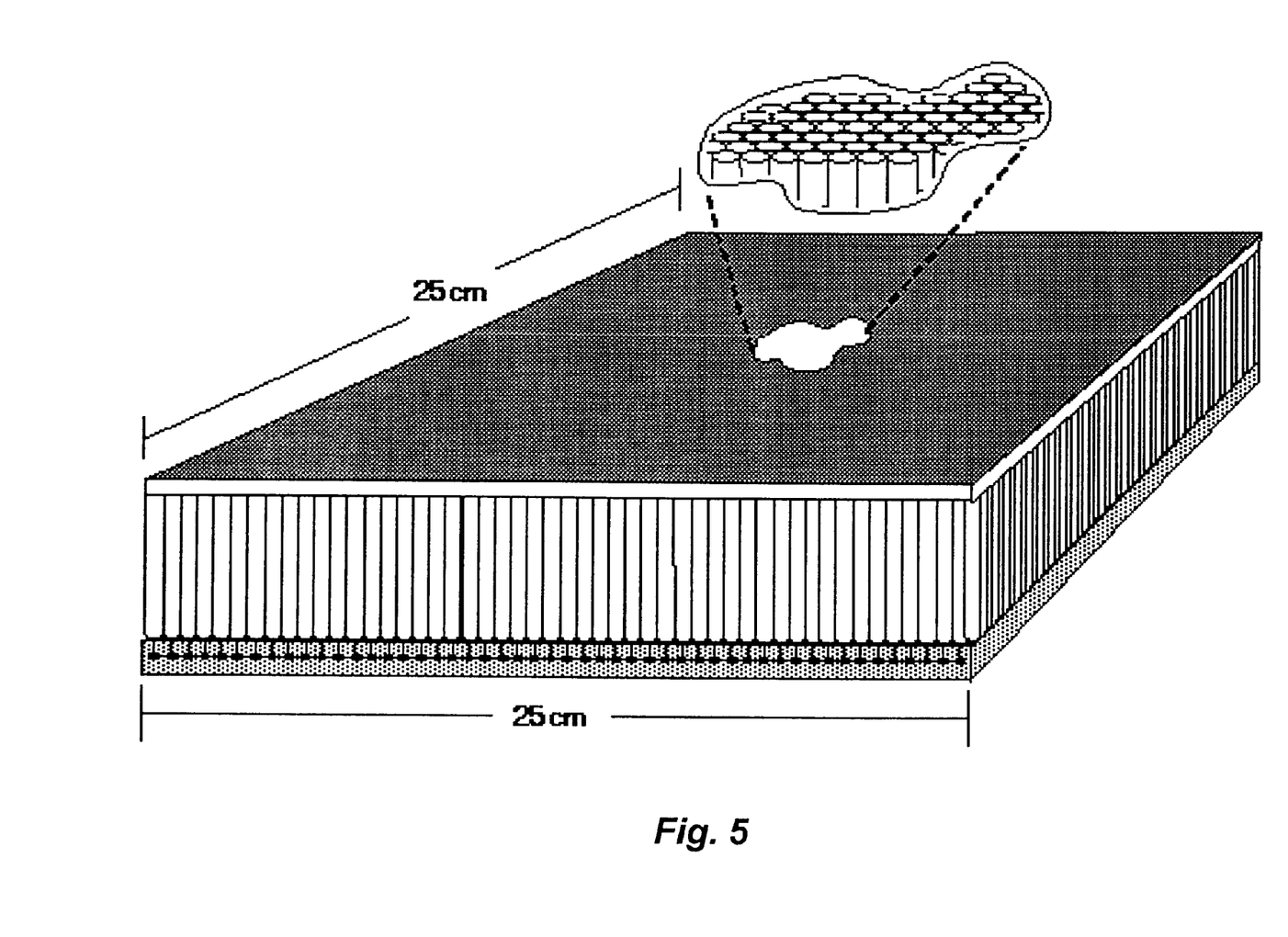
FIG. 5 illustrates, in schematic prospective view, the detector volume of a camera of this invention containing multiple detector tubes like those of FIG. 3.

Introduction of tubes within the detection volume obviously introduces the possibility of losing sensitivity through interactions with the tube walls. Although several configurations of the packing and shape may be investigated, a preferred design is shown in FIG. 5, in which circular tubes are packed with minimal interstitial volume. In this design, the fractional cross-sectional area encompassed by the tube walls is given by the equation: $F_s=3.628$ T/D, where D=tube OD and T=wall thickness. The density of septal material averaged over a cross-sectional area is $\rho_{\mathit{eff}}=(\rho_s)(F_s)$, where $P_p$ is the density of septal material. Therefore, in a depth element, dx, of the detector, the fraction of events interacting in the septa is given by $$E_s = \frac{\mu_s \rho_{\mathit{eff}} dx}{\mu_s \rho_{\mathit{eff}} dx + \mu_x \rho_x dx} = \frac{\mu_s \rho_{\mathit{eff}}}{\mu_s \rho_{\mathit{eff}} + \mu_x \rho_x}$$

where $\mu_s$=linear attenuation coefficient of the septal material, $\mu_x$=linear attenuation coefficient of xenon, and $\rho_x$=density of xenon. As an example, for 60 keV radiation and aluminum tubing of dimension 3/16" OD and 0.012" wall thickness and xenon pressure of 20 atm, $E_s$=0.12, or 12% loss of events due to septal interactions. At 20 atm, the 0.012" wall thickness can be reduced substantially while still maintaining an adequate safety factor of four (FIG. 6). This would reduce the septal interaction in proportion to the reduction of wall thickness. Also, pressure increase above 20 atm could be considered and would reduce this effect substantially.

Figure 4:
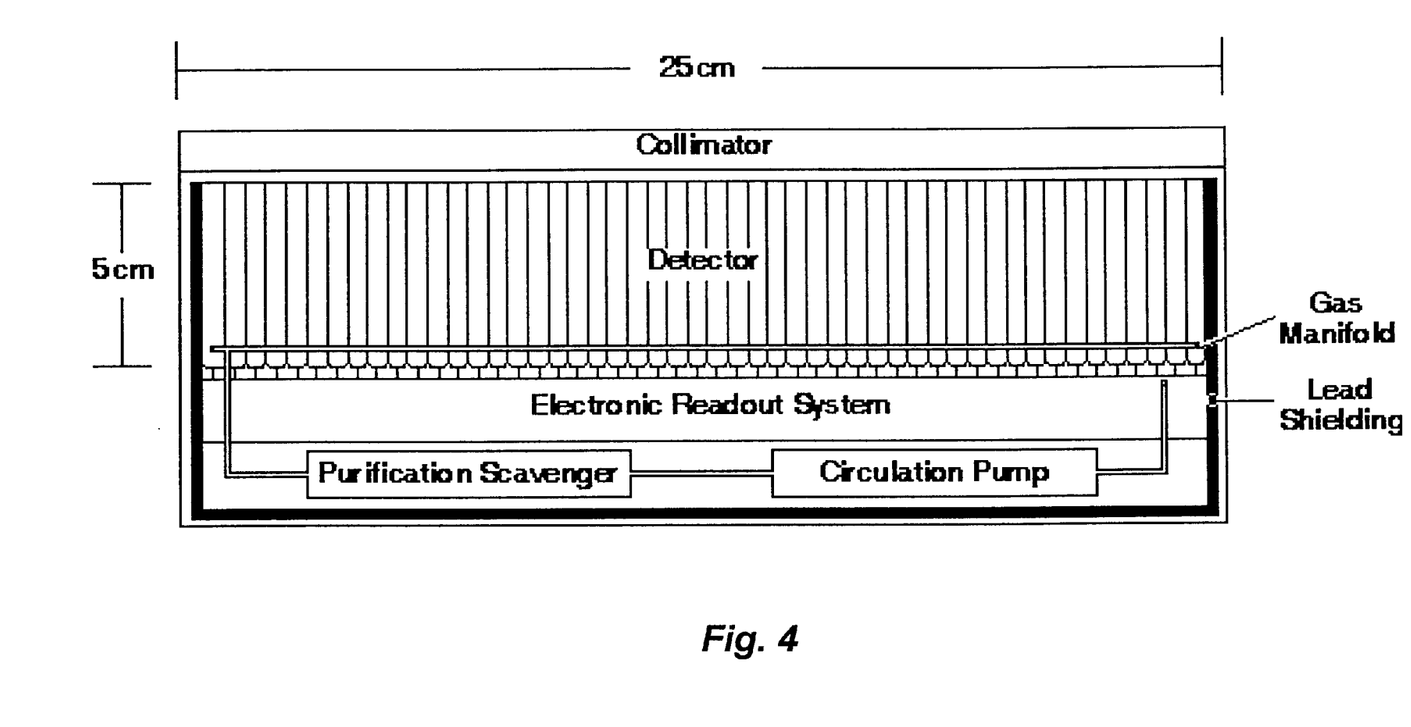
FIG. 4 illustrates in cross-sectional view a camera of this invention wherein multiple detector tubes like those of FIG. 3 are arranged within the detector volume of the camera.

Attaining tube burst pressure ratings providing an ample margin of safety is quite feasible. Also, since the tube cross-section is very small, safely containing the pressure with appropriate end plugs is not be difficult. The tubes used in the pilot study used simple epoxied plastic plugs and were tested to more than 1,000 psi. Unlike typical straw detectors used in high energy physics, incident radiation must pass through one of the end plugs. Therefore, attenuation in the plug material must be considered. One approach is illustrated in FIG. 3, using a two-layer design, with the inner plug composed of a low-outgasing material such as ceramic, and with the outer plug composed of a plastic for added strength. The ceramic part could actually be welded into the tube using modern ceramic-to-metal bonding techniques. Because of the small amount of stored energy in any one tube, failure of a single tube end plug should not jeopardize patient safety. Ample material may be provided on the face of the camera to prevent any penetration outside of the camera itself in such an event. The collimator (FIGS. 4 and 5) provides an additional safety net. Adequate gas venting routes can be provided to prevent pressure buildup in the camera case or face structure (FIG. 4). The final camera module will be tested to pressures substantially above the operating pressure prior to filling with final gas mix.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A structure for detecting radiation, comprising:

a tube having (1) an electrically conductive shell structure of circular or polyhedral cross section, having a proximal and distal end, (2) a pressure retaining and electrically insulative tube end closure means at each tube end, (3) a coaxial central wire conductive element which runs along the central axis of the tube and is insulated from the conductive shell structure, said tube containing either pure xenon or predominantly xenon, together with one or more quench gas components, at a pressure sufficient to provide efficient interaction of photons of greater than 50 keV energy by photoelectric effect within a path length of 10 cm or less and to assure a photoelectron range of less than a few millimeters.

2. A structure for detecting radiation useful in an imaging camera for nuclear medicine comprising a plurality of tubes having (1) an electrically conductive shell structure of circular or polyhedral cross section, having a proximal and distal end, (2) a pressure retaining and electrically insulative tube end closure means at each tube end, (3) a coaxial central wire conductive element which runs along the central axis of the tube and is insulated from the conductive shell structure, said tube containing predominantly xenon, together with one or more quench gas components, at a pressure sufficient to provide efficient interaction of photons of greater than 50 keV energy by photoelectric effect within a path length of 10 cm or less and to assure a photoelectron range of less than a few millimeters; and tubes distributed in space such that each proximal and distal tube end is in a common plane one with another, respectively.

3. The structure of claim 2, wherein the coaxial electrically conductive element of each of said plurality of tubes is arranged for electrical connection to a positive electrical potential and the electrically conductive shell structure of each of said plurality of said tubes is arranged for electrical connection to a negative electrical potential.

4. The structure of claim 2, wherein xenon exerts a partial pressure within said tube of at least about 20 atm.

* * * * *